United States Patent
Theiss et al.

(10) Patent No.: US 7,921,023 B2
(45) Date of Patent: Apr. 5, 2011

(54) PORTAL FOR IMPLEMENTATION OF MULTIPLE SOFTWARE COMPONENTS

(75) Inventors: Guenther Theiss, Bad Schonbom (DE); Guenter Blattner, Oberhausen (DE); Werner Wolf, Wiesloch (DE); Stefan Hack, Wiesloch (DE); Michael Erhardt, Westhofen (DE)

(73) Assignee: SAP Aktiengesellschaft, Walldorf ( * ) Notice: Subject to any disclaimer, the term of this patent is extended or adjusted under 35 U.S.C. 154(b) by 1995 days.

(21) Appl. No.: 10/233,321

(22) Filed: Aug. 30, 2002

(65) Prior Publication Data
US 2003/0126050 A1  Jul. 3, 2003

Related U.S. Application Data

(60) Provisional application No. 60/343,161, filed on Dec. 28, 2001.

(51) Int. Cl.
G06F 9/44 (2006.01)
(52) U.S. Cl. ............ 705/7; 717/100; 717/107; 705/8
(58) Field of Classification Search .......... None
See application file for complete search history.

(56) References Cited

U.S. PATENT DOCUMENTS

| | | | |
|---|---|---|---|
| 4,674,042 A | | 6/1987 | Hernandez et al. |
| 5,838,918 A | * | 11/1998 | Prager et al. .......... 709/221 |
| 5,884,287 A | | 3/1999 | Edesess |
| 5,913,218 A | * | 6/1999 | Carney et al. .......... 707/200 |
| 6,005,571 A | * | 12/1999 | Pachauri .......... 715/764 |
| 6,026,336 A | | 2/2000 | Sakurai et al. |
| 6,047,279 A | * | 4/2000 | Barrack et al. .......... 706/60 |
| 6,119,149 A | * | 9/2000 | Notani .......... 709/205 |
| 6,151,707 A | | 11/2000 | Hecksel et al. |
| 6,222,533 B1 | * | 4/2001 | Notani et al. .......... 715/733 |
| 6,230,309 B1 | * | 5/2001 | Turner et al. .......... 717/107 |
| 6,256,676 B1 | | 7/2001 | Taylor et al. |
| 6,266,666 B1 | * | 7/2001 | Ireland et al. .......... 707/10 |
| 6,311,144 B1 | * | 10/2001 | Abu El Ata .......... 703/2 |
| 6,345,239 B1 | | 2/2002 | Bowman-Amuah |
| 6,473,794 B1 | * | 10/2002 | Guheen et al. .......... 709/223 |
| 6,633,923 B1 | * | 10/2003 | Kukura et al. .......... 719/316 |
| 6,708,172 B1 | * | 3/2004 | Wong et al. .......... 707/10 |

(Continued)

FOREIGN PATENT DOCUMENTS

JP  2-277126  11/1990

(Continued)

OTHER PUBLICATIONS

M Fan, J Stallaert and AB Whinston "The Adoption and Design Methodologies of Component-Based Enterprise Systems." European Journal of Information Systems (2000) 9: pp. 25-35.*

(Continued)

*Primary Examiner* — Romain Jeanty
*Assistant Examiner* — Gurkanwaljit Singh
(74) *Attorney, Agent, or Firm* — Fish & Richardson P.C.

(57) ABSTRACT

In certain embodiments, a system and method of receiving data indicates one or more software components included in a user's system landscape, receives a user's selection of a software component to be managed or customized, accesses the software component in response to the user's selection, receives a user's input relating to an alteration to be made to a feature or setting of the software component, and modifies one or more files associated with the software component to reflect the alteration.

10 Claims, 13 Drawing Sheets

U.S. PATENT DOCUMENTS

| | | | |
|---|---|---|---|
| 6,721,740 B1* | 4/2004 | Skinner et al. | 707/10 |
| 6,748,569 B1* | 6/2004 | Brooke et al. | 715/207 |
| 6,757,899 B2* | 6/2004 | Zhdankin et al. | 719/315 |
| 6,772,216 B1* | 8/2004 | Ankireddipally et al. | 709/230 |
| 6,792,462 B2* | 9/2004 | Bernhardt et al. | 709/225 |
| 6,868,427 B2* | 3/2005 | Herzog et al. | 707/104.1 |
| 6,904,449 B1* | 6/2005 | Quinones | 709/203 |
| 7,000,219 B2* | 2/2006 | Barrett et al. | 717/107 |
| 7,051,036 B2* | 5/2006 | Rosnow et al. | 707/723 |
| 7,089,279 B1* | 8/2006 | Sakaguchi | 709/203 |
| 7,188,158 B1* | 3/2007 | Stanton et al. | 709/220 |
| 7,280,973 B1* | 10/2007 | Hack et al. | 705/7 |
| 7,290,147 B2* | 10/2007 | Bittner et al. | 713/187 |
| 7,337,195 B2* | 2/2008 | Hrle et al. | 707/202 |
| 7,346,893 B2* | 3/2008 | Deimel et al. | 717/121 |
| 7,392,236 B2* | 6/2008 | Rusch et al. | 707/2 |
| 2002/0010781 A1* | 1/2002 | Tuatini | 709/227 |
| 2002/0038336 A1* | 3/2002 | Abileah et al. | 709/203 |
| 2002/0042751 A1* | 4/2002 | Sarno | 705/26 |
| 2002/0042849 A1* | 4/2002 | Ho et al. | 709/329 |
| 2002/0046294 A1* | 4/2002 | Brodsky et al. | 709/246 |
| 2002/0049573 A1* | 4/2002 | El Ata | 703/2 |
| 2002/0052769 A1* | 5/2002 | Navani et al. | 705/7 |
| 2002/0056012 A1* | 5/2002 | Abileah et al. | 709/310 |
| 2002/0065696 A1* | 5/2002 | Hack et al. | 705/7 |
| 2002/0073396 A1* | 6/2002 | Crupi et al. | 717/104 |
| 2002/0078010 A1* | 6/2002 | Ehrman et al. | 707/1 |
| 2002/0107920 A1* | 8/2002 | Hotti | 709/204 |
| 2002/0174097 A1* | 11/2002 | Rusch et al. | 707/1 |
| 2003/0046681 A1* | 3/2003 | Barturen et al. | 717/177 |
| 2003/0106039 A1* | 6/2003 | Rosnow et al. | 717/100 |
| 2003/0144892 A1* | 7/2003 | Cowan et al. | 705/8 |
| 2003/0187763 A1* | 10/2003 | Jordan et al. | 705/35 |
| 2003/0188290 A1* | 10/2003 | Corral | 717/101 |
| 2003/0212690 A1* | 11/2003 | Surma et al. | 707/100 |
| 2003/0222903 A1* | 12/2003 | Herzog et al. | 345/744 |
| 2004/0249482 A1* | 12/2004 | Abu El Ata et al. | 700/44 |
| 2005/0021348 A1* | 1/2005 | Chan et al. | 705/1 |

FOREIGN PATENT DOCUMENTS

JP        11-338682        12/1999

OTHER PUBLICATIONS

R.H. Weston "Reconfigurable, component-based Systems and the Role of Enterprise Engineering Concepts." Elsevier Science B.V. : Computers in Industry 40 (1999): pp. 321-343.*

M. Lynne Markus and Cornelis Tanis "The Enterprise System Experience—From Adoption to Success." Framing The Domains Of IT Management: Projecting the Future Through the Past (2000): Chapter 10, pp. 173-207.*

Hoffner Y., Ludwig H., Grefen P., Aberer K., "Crossflow: Integrating Workflow Management and Electronic Commerce" ACM SIGecom Exchanges vol. 2, Issue 1 (Winter 2001) pp. 1-10.*

Jianxun Liu; Shensheng Zhang; Jian Cao; , "An inter-enterprise workflow management system for B2B e-commerce and supply chain: a case study," Systems, Man, and Cybernetics, 2001 IEEE International Conference on , vol. 5, no., pp. 2921-2926 vol. 5, 2001.*

M. Feather, H. In, J. Kiper, J. Kurtz, and T. Menzies, "First contract: Better, earlier decisions for software projects" In Submitted to the ACM CIKM 2001: the Tenth International Conference on Information and Knowledge Management, 2001.*

Pamela Zave, "The Operational Versus the Conventional Approach to Software Development" Communications of the ACM vol. 27, No. 2 (Feb. 1984).*

Volker Gruhn et al., "A Software Process for an Integrated Electronic Commerce Portal System" V. Ambriola (Ed.): EWSPT 2001, LNCS 2077, pp. 90-101, 2001.*

Norbert A Streitz et al., "i-Land: An Interactive Landscape for Creativity and Innovation" ACM (May 1999).*

Ali Arsanjani "CBDI: A Pattern Language for Component-based Development and Integration" EuroPLoP 2001 Conference.*

Scott M Confer, Sanjay Batra "Cognitive Ergonomics for Websites: Form Concept to Realization" Proceedings of the IEA 2000/HFES 2000 Congress.*

E. N. Houstis et al., "MyPYTHAI: A Recommendation Portal for Scientific Software and Services" Concurrency Computat.: Pract. Exper. 2002.*

Kenneth S. Norton "Applying Cross-Functional Evolutionary Methodologies to Web Development" WebEngineering 2000, LNCS 2016, pp. 48-57, 2001.*

*ARIS Toolset*, IntelliCorp, Data sheet [on-line] from Collaborative Processes Integration website Retrieved from the Internet Mar. 6, 2003 at URL: http://cpi.co.za/products/toolset.html.

*ARIS Toolset*, IntelliCorp, Data sheet from IDS Scheer Inc. 1205 Westlakes Drive, Suite 270, Berwyn, PA 19312.

*Ascendant Methodology*, PriceWaterhouseCoopers, Marketing data release [on-line]. Retrieved from the Internet Mar. 9, 2003 at URL: http://www.pwcglobal.com/Extweb/service.nsf/docid/B5DF953737D8C8E180256A0D005B9FC1.

*Business Case Analysis*, Oracle Corp., Data sheet [on-line]. Retrieved from the Internet Mar. 9, 2003 at URL: http://www.oracle.com/consulting/offerings/strategy/sva_ds.html.

Thomas Hess/Leo Brecht, *State of the Art Des Business Process Redesign—Darstellung und Vergleich bestehender Methoden*, Gabler, 1995, (English translation attached).

Scheer, *Business Process Engineering*, 2nd Edition, Springer-Verlag, 1994 (Table of Contents only).

Sabatine Scelza, "Information Technology Support for Supply Chain Management," Dissertation, Johann Wolfgang Goethe University, Aug. 13, 1999, (English translation attached).

Notification of Transmittal of the International Search Report or the Declaration for Application No. PCT/IB02/05779, dated Jul. 24, 2003, 5 pages.

Japanese Patent Office, Decision of Rejection for Application No. 2003-560811, dated Aug. 20, 2009, 3 pages.

* cited by examiner

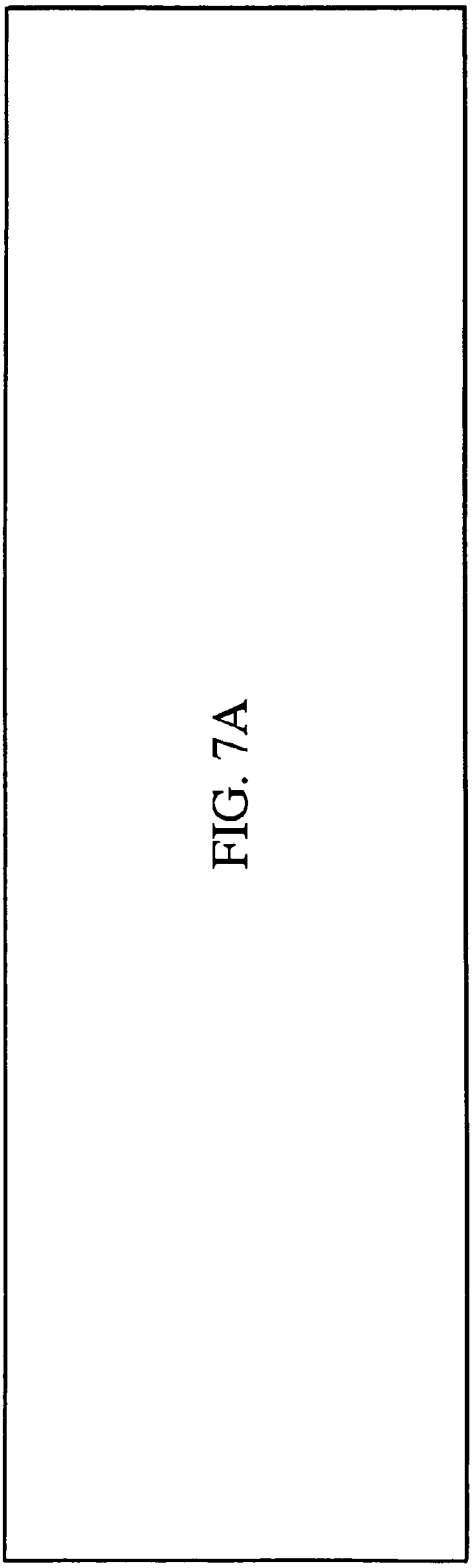
FIG. 7A
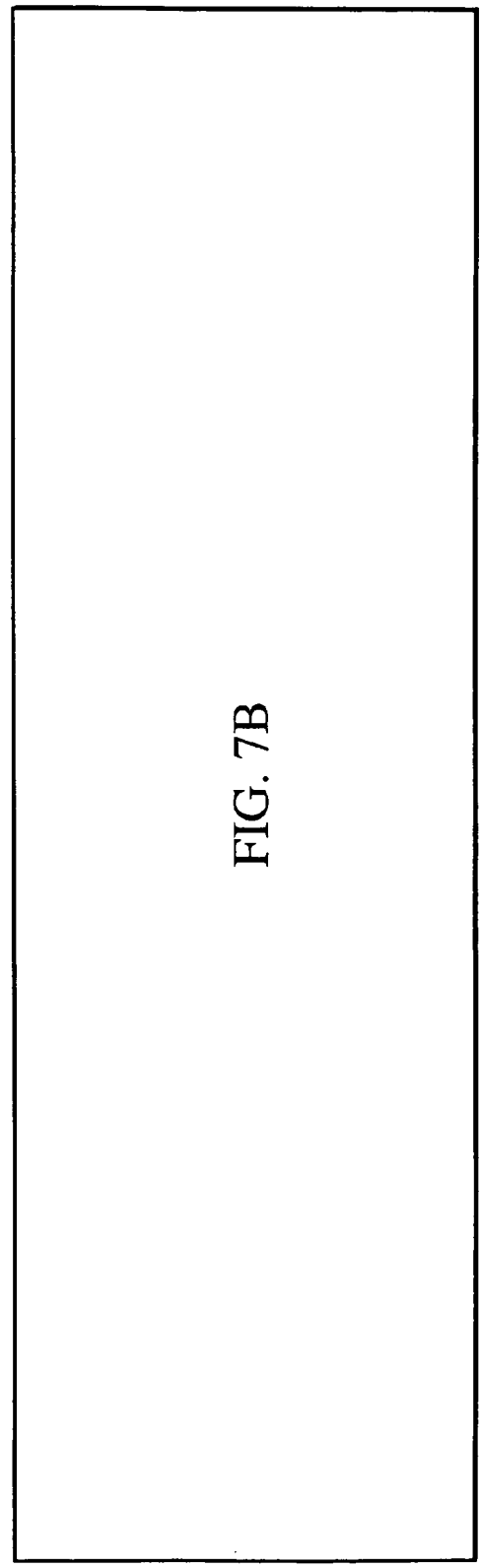
FIG. 7B
FIG. 7

PORTAL FOR IMPLEMENTATION OF MULTIPLE SOFTWARE COMPONENTS

RELATED APPLICATIONS

This application is a continuation of Provisional Application Ser. No. 60/343,161, filed Dec. 28, 2001, which is incorporated herein.

BACKGROUND

This application relates to an implementation of multiple software components for executing business processes, and in certain embodiments to methods and systems of implementation of multiple software components using a portal.

An industry is typically comprised of business entities that interact with other business entities. The business entities may include market participants who may use software tools to exchange information with other participants. The market participants in an industry may use many business processes to interact with other market participants. Business processes may include activities to achieve a specific business result, such as customer relationship management, which enables a business to provide support for its customers during points of the product life-cycle. The market participants may belong to the same or different business entities.

Where multiple market participants sharing a common business goal interact electronically, they may collaborate, creating value-generating business processes that extend beyond the boundaries of an enterprise. Alternatively, the business processes may be intra-enterprise processes. Such collaboration may occur in traditional businesses such as the chemical, automotive, or other non-electronic commerce based businesses.

Software components exist that may provide enterprises and business entities with supply chain management and customer relationship management services, for example. By tailoring multiple software components, which may assist business entities in ordering, shipping, product tracking, inventory control, etc., for a specific scenario in which business entities are collaborating and by coordinating deployment of these multiple software components for the specific scenario, increased efficiencies and synergies can result.

SUMMARY

In one aspect, a method is disclosed of receiving data related to a user's system landscape. The data indicates one or more software components included in the landscape. The method also includes receiving a user's selection of a software component to be managed or customized, accessing the software component in response to the user's selection, receiving a user's input relating to an alteration to be made to a feature or setting of the software component and modifying one or more files associated with the software component to reflect the alteration. In an embodiment, the aforesaid method may include displaying a profile of the system landscape and a software component. In another embodiment, the aforesaid method may include displaying a feature or setting associated with the software component. In another embodiment, the aforesaid method may include receiving a user's input to modify a business process or business document reflected in the system landscape. In another embodiment, the aforesaid method may include receiving a user's selection of a test protocol for verification of the software components associated with the system landscape and executing the selected test protocol.

A second aspect is an article comprising a computer-readable medium or propagated signal having embodied thereon a computer program configured to generate a user interface for customizing a computer system, such that the medium comprises code segments configured to perform the method disclosed above.

In a third aspect, a system for customizing a computer system is provided that includes a processor connected to a storage device and one or more input/output devices, such that the processor is configured to perform the method disclosed above.

In various implementations, the above techniques may provide one or more of the following advantages. A user is provided with a central point of access to configure user roles, navigate through various system landscapes, configure multiple software components and store project documentation. A user is also provided with an integrated solution for configuring and implementing software components from various companies. A user is provided with a speedy and safe implementation of multiple software components using pre-packaged business expertise.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION OF ILLUSTRATIVE EMBODIMENTS

Figure 1A:
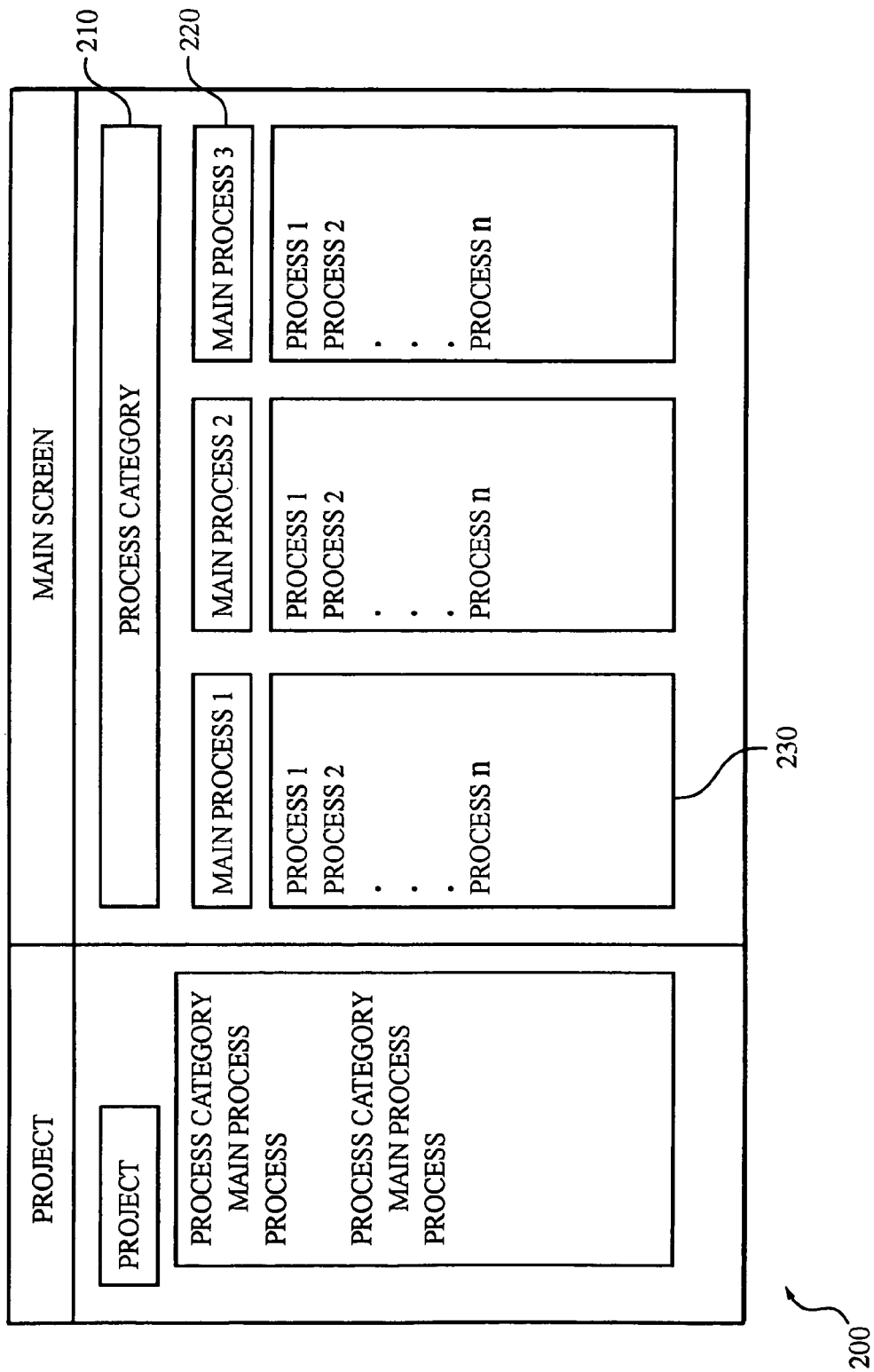
FIG. 1A is a diagram of a solution map, according to one implementation.

Companies are confronted with a challenge of implementing processes, such as business processes. The processes may be internal processes that describe and support collaboration between departments, such as sales and production, for example. Companies also may need to implement processes that support collaboration with another business entity. Companies may want to support their key business functions using software. The present method and system provides a portal for the implementation of multiple software components. The multiple software components may support inter-enterprise and intra-enterprise business processes. Referring to FIG. 1A, a solution map may be used to describe these processes. A solution map 200 is a tool help visualize, plan and implement an information technology solution within a company. A solution map helps a business in a particular industry understand what kind of processes it needs to support. A solution map may have a three-level hierarchy that includes a process category 210, main processes 220, and processes 230. The process categories 210 depict the most relevant business process categories for an industry. The main processes 220 illustrates the most relevant business processes 230 within process categories in an industry. In order make the solution map more comprehensible, at least two views may be provided. The first view may provide a broad picture of the main processes 220 within each industry. These main processes may be arranged in process categories 210 and represent important business processes 230 in an industry. The second view may provide a more detailed view of the specific functionality required for each process.

Figure 1B:
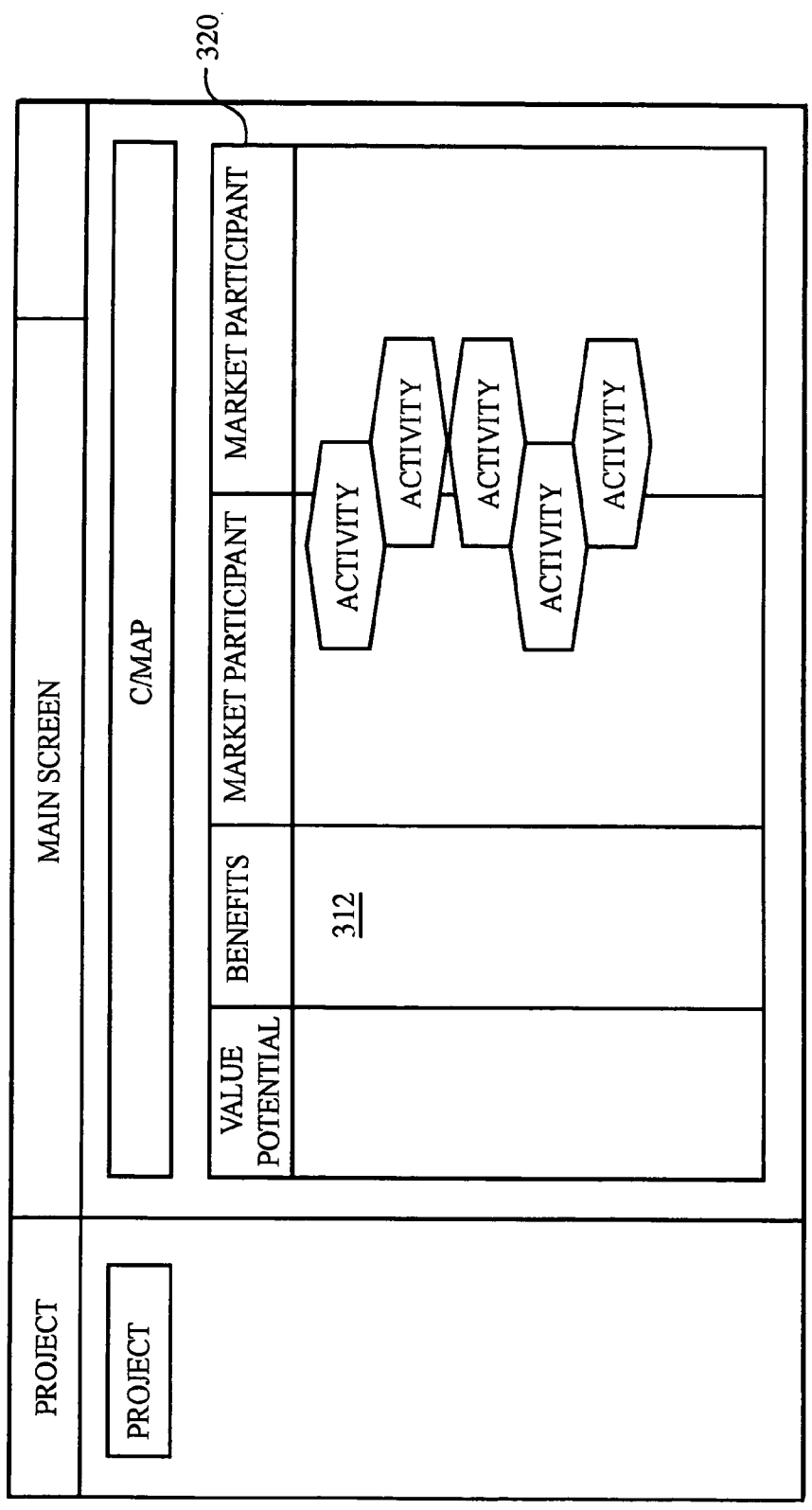
FIG. 1B is a diagram of a business view of a collaborative business map, according to one implementation.
Figure 1C:
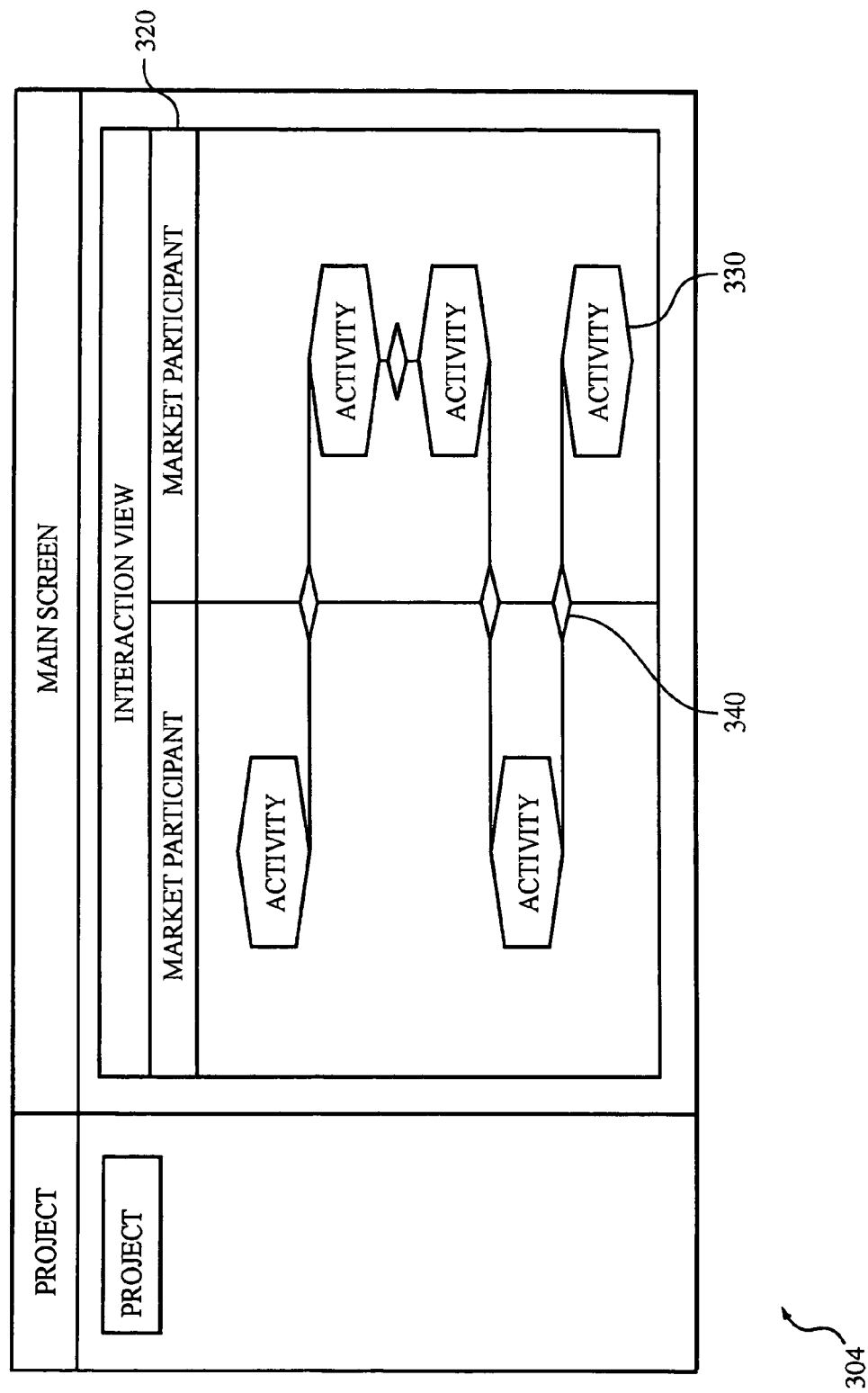
FIG. 1C is a diagram of an interaction view of a collaborative business map, according to one implementation.
Figure 1D:
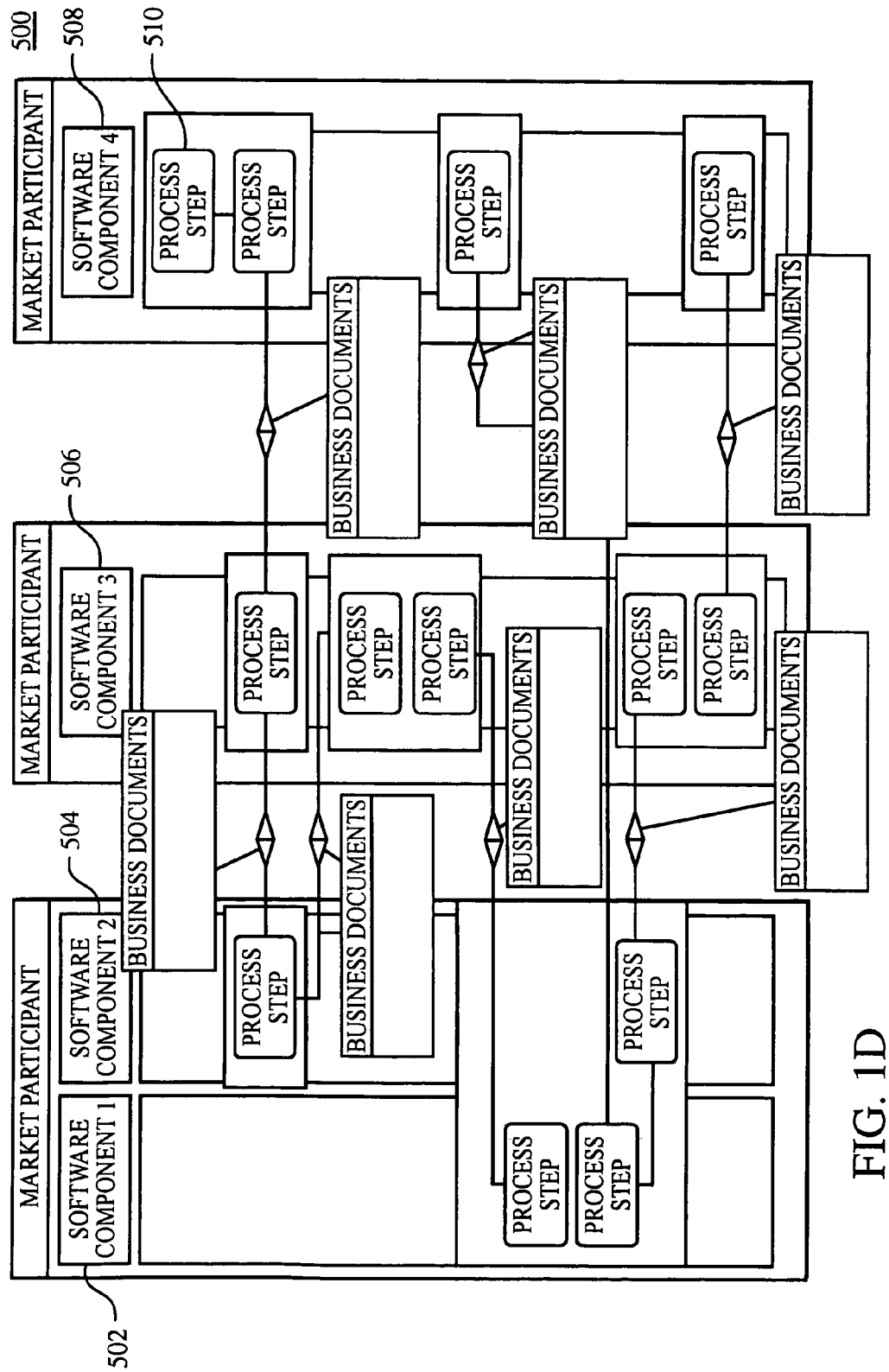
FIG. 1D is a diagram of a component view of a collaborative business map, according to one implementation.

Referring to FIG. 1B, a collaborative business map or collaborative business scenario illustrates the process flow, responsibility of market participants 320, and business benefits 312 of processes that a business wants to support. A business view 302 of a collaborative scenario is shown. The business view describes the participants 320 and scope of the described business process from the business point of view and documents the business advantage of implementing a collaborative business scenario. Referring to FIG. 1C, an interaction view 304 of a collaborative business map provides information 330 about the roles and responsibilities of the market participants 320 and the documents 340 that are exchanged between the market participants. It also provides detailed information about a business process that needs to be implemented on potentially multiple components. Referring to FIG. 1D, a component view 500 of a collaborative business map provides information about the multiple software components 502, 504, 506, 508 required to implement the business process. Process steps 510 and transactions are mapped to specific software components. It also provides technical requirements or restrictions (e.g., compatibility or release information) that may apply.

A solution map may be derived from the information of a collaborative business map. Solution maps provide a blueprint of an industry's application landscape. Solution maps also provide a map and overview of business processes within an industry whereas collaborative business maps provide a description of collaborative end-to-end business processes that involve multiple participants within or outside the organization. For example, an original equipment manufacturer (OEM) in the automotive industry may create a solution map of the major processes in the automotive industry and a collaborative business map of the collaborative business processes between the OEM and other market participants in the industry, such as piece-part suppliers. These business maps can be modified according to the needs of the user or the industry being analyzed. The tool solution map 252 may identify information technology (IT) dependent tasks performed within the collaborative business systems, and determine an array of potential implementations to facilitate those tasks. The software processes identified in a solution map may be performed by various software components.

Figure 2:
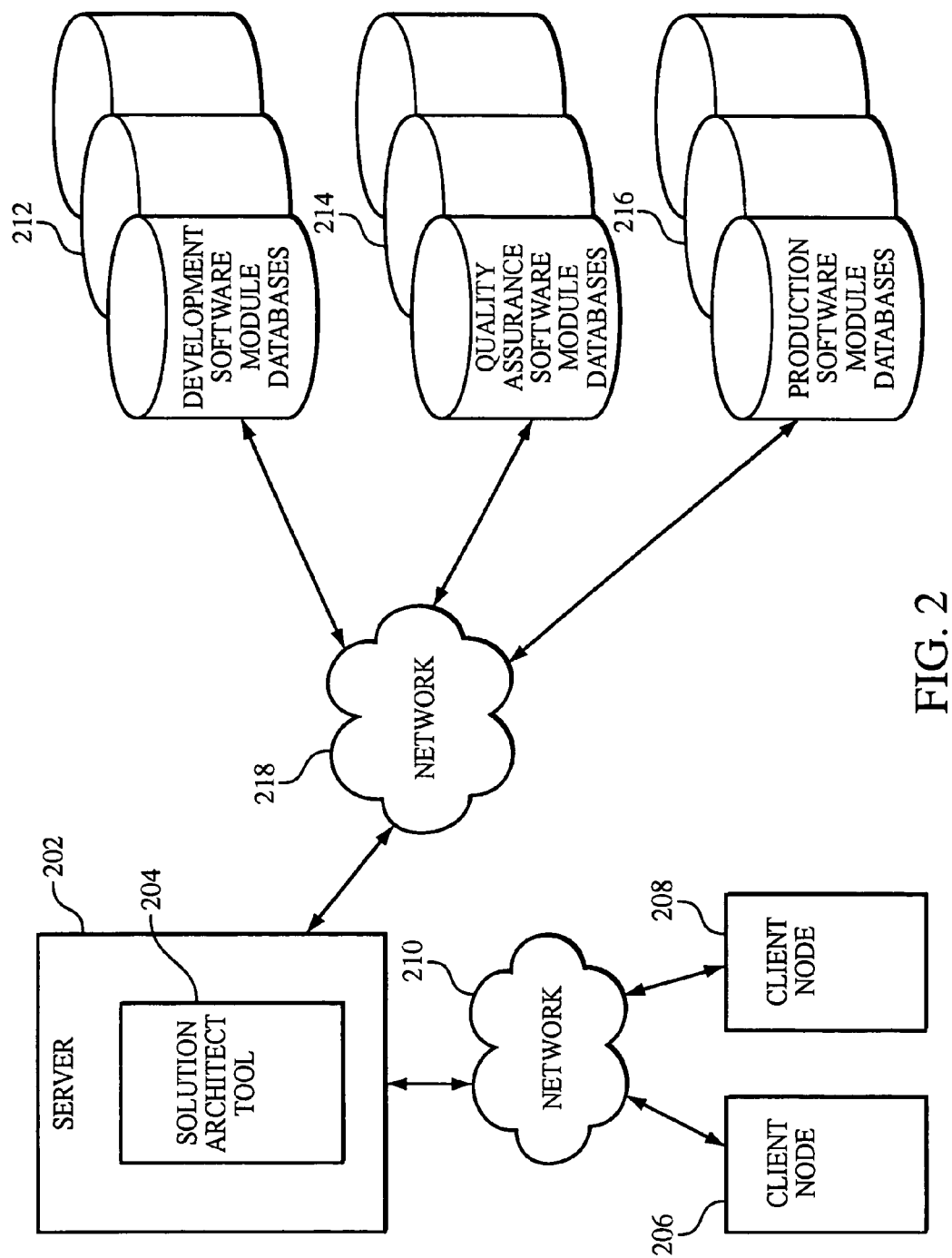
FIG. 2 is a block diagram of a computer system for implementing multiple software components, according to one implementation.

After a company has defined business processes it needs to support, they face the challenge of implementing these processes, which were illustrated using solution and collaborative business maps, on multiple software components. FIG. 2 is a block diagram of an embodiment of a computer system 200 that includes one or more servers 202 for hosting a tool 204 for accessing and customizing multiple programs or components which may be utilized by market participants and then implementing the software components. The portal for implementing these multiple software components allows both access to the software tools and access to functionality in the tool that allows implementation of processes located on multiple software components. The tool 204 may be accessed by a user using a computer, such as client node 206, 208 over a network 210. The server 202, for example, an Internet-accessible server, may access databases 212, 214, 216, which may store and retrieve information, such as information related to the operation of the server 202, information related to the execution of the tool 204 or other information, over a network 218. The operation of the tool 204 is described in further detail below.

The tool 204 may be executed in at least two modes. In an online mode, the tool 204 can be distributed and executed on one or more servers 202 and accessed by a user using a client node 206, 208. Alternatively, in an offline mode, the user can download the tool 204 onto the client node 206, 208 from the server 204 and execute the tool on the computer device. The tool may also be obtained through distribution channels including diskettes, CD-ROM or other such media. The network 218 may include a plurality of devices such as servers, routers and switching circuits connected in an intranet, extranet or Internet configuration.

A user may use a client node 206, 208 to access the server 202 over a network 210. The client node may include a personal computer (PC), personal digital assistant (PDA) or other device using wireless or wired communication protocols to access the server 202. The client node 206, 208 may be coupled to I/O devices (not shown) that may include a keyboard in combination with a pointing device such as a mouse to input data into the computer, a computer display screen and/or a printer to produce output from the computer, a storage resource such as a hard disk drive for storing and retrieving data for the computer, and/or other I/O devices. The client node 206, 208 also may include a database (not shown) to store and retrieve data related to the execution of the tool 204.

The solution architect tool 204 may provide a user interface on the display of the client node 206, 208 that accesses and customizes various system programs and components used by one or more market participants. The tool 204 uses the portal to integrate content (e.g., best practices), tools (e.g., software tools for project administration, blueprint definition, project configuration, project consistency checking, conducting tests, etc.), and methodologies (e.g., accelerated implementation methodologies) that allow the tool 204 to access and customize multiple programs or components which may be utilized by market participants and then implement the software components.

The solution architect tool 204 may be used to create a solution for implementing multiple software components for market participants, document business scenarios and processes for which new transactions and programs have been developed, and also may assign transactions, implementation software, and test cases to be used by specific business processes. The solution architect tool 204 may be used by a business partner to create its own support materials for its customers (e.g., a single site project), larger companies who want to roll out a global template of customizing to their subsidiaries (e.g., a reusable e-business solution project), and internally by a company to document new business scenarios and to prepare the scenarios for validation by the production department.

Figure 3:
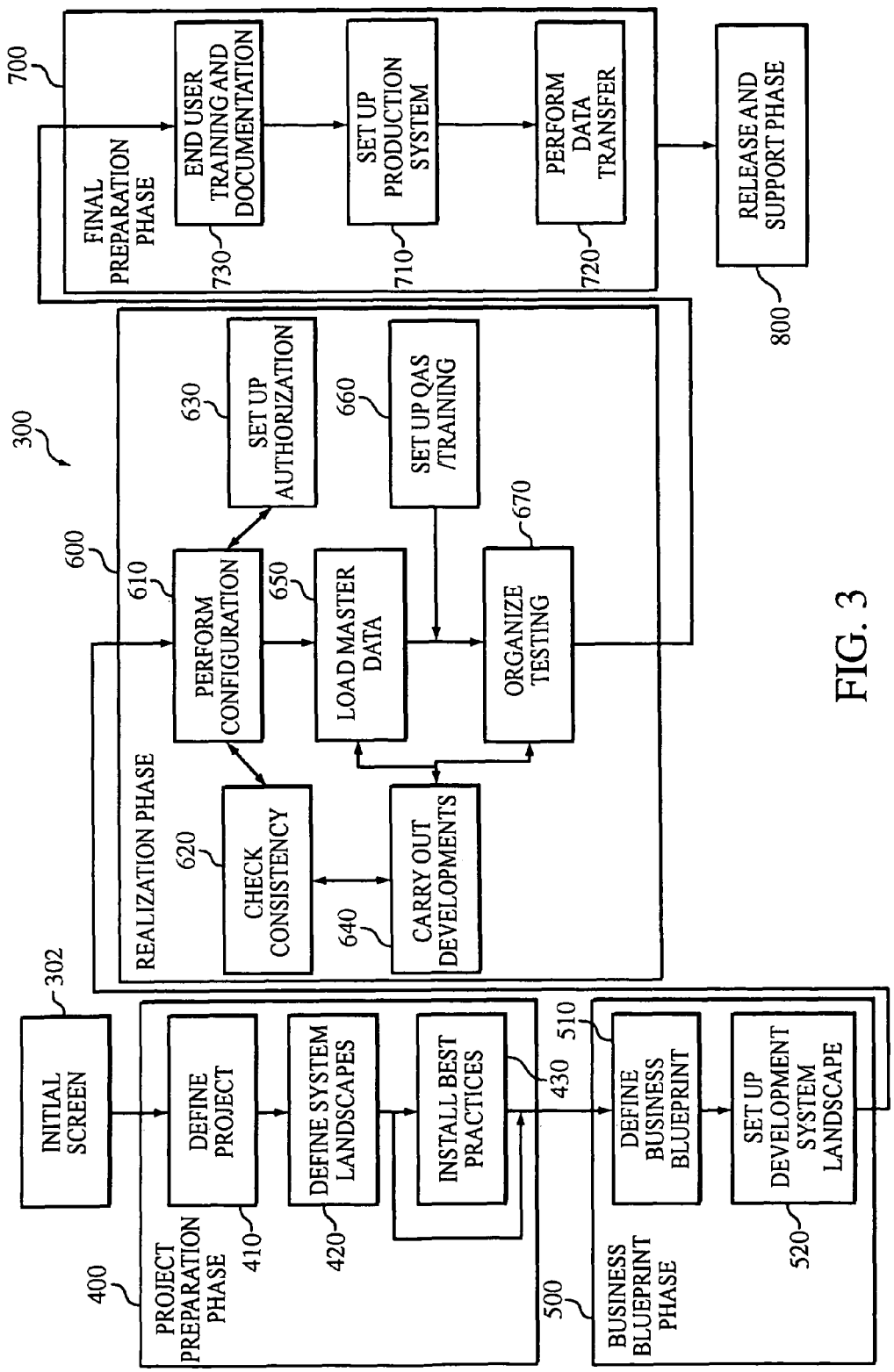
FIG. 3 is flow diagram of a process for implementing multiple software components, according to one implementation.

Referring to FIG. 3, the solution architect tool 204 may perform the following process phases for accessing, customizing, and then implementing multiple programs or components which may be utilized by market participants: project preparation 400, business blueprint 500, realization 600, final preparation 700, and release and support 800. Each phase may have project activities associated with the phase. During the project preparation phase 400 a user may use the solution architect tool to create/define a project 410, define the time frame of the project, assign members to a project, define project standards, define a system landscape 420 of all software components of the solution platform and install best practices (discussed in detail below). During the next phase of the project, business blueprint 500, the solution architect tool may be used to evaluate the best practices (i.e., business content which includes proven methodology) scenarios that are installed, create/define a business blueprint 510 that includes documenting the project's requirements, and using a structure for editing the processes (e.g., sales management, supply chain monitoring, product engineering, etc.) of the business, and setting up a development system landscape 520. During the next project phase, realization 600, a user may use the solution architect tool to configure multiple programs or components (e.g., forecasting, purchasing, order processing, inventory management, warehouse management, etc.) using pre-configuration data that reflects the best methodologies and practices for performing tasks in a specific business scenario (e.g., SAP's Best Practices). Additionally, during the realization project phase 600, the user may configure multiple programs or components 610, check the consistency 620 of the customizing of the multiple programs or components across all components of the solution platform, establish an authorization concept 630, carry out company-specific developments 640, load master data 650, set up a quality assurance system, and test the implemented solution. During the next phase, final preparation 700, a user may use the solution architect tool to set up the system landscape for production 710, prepare a data transfer 720 and conduct end user training 730. In the final project phase, release and support 800, the multiple programs or components are released and customer support may be provided.

Figure 4:
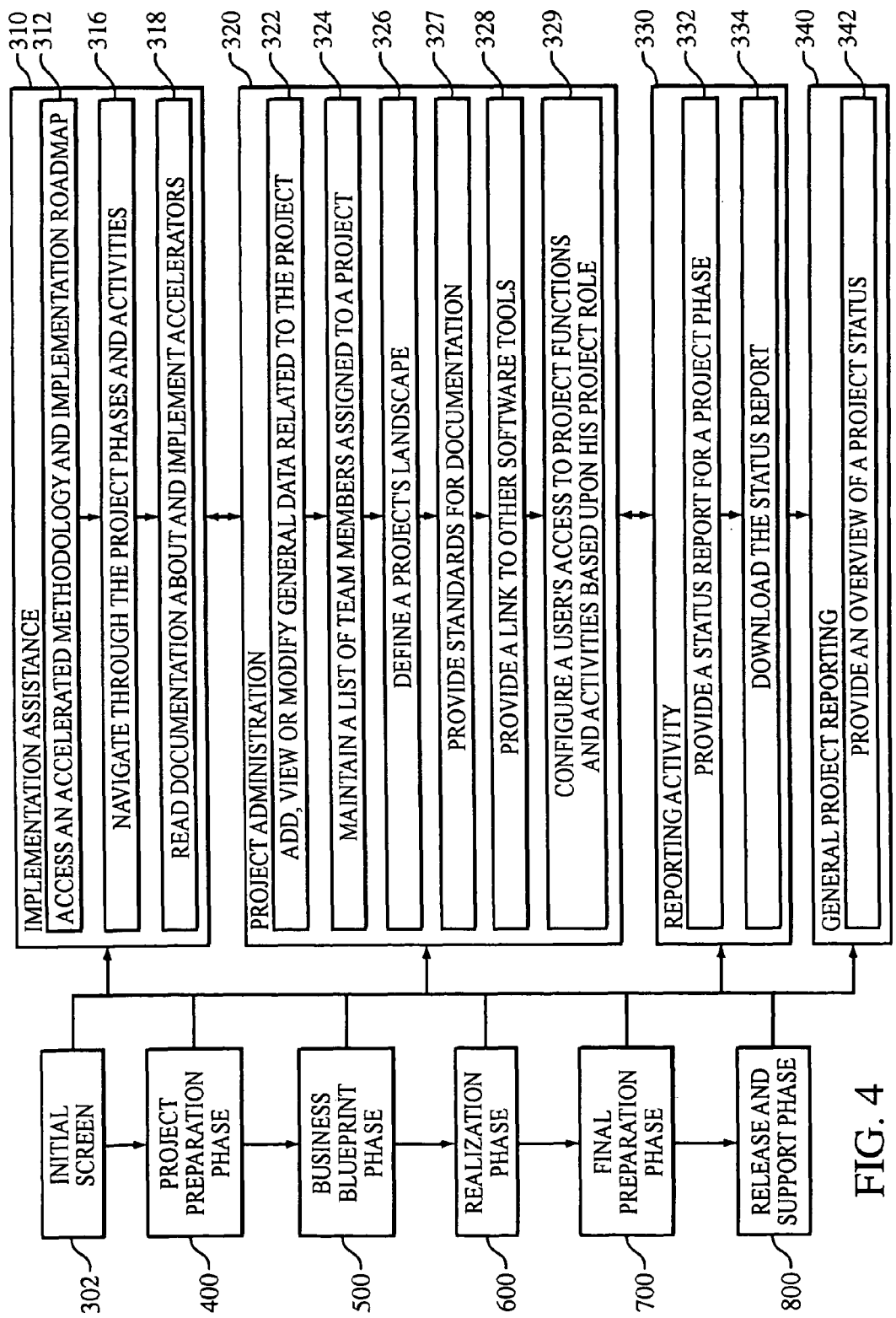
FIG. 4 is a flow diagram of a process for project implementation assistance, project administration activities, reporting activities and a general reporting activities, according to one implementation.

Referring to FIG. 4, in addition to activities for each project phase, the solution architect tool also may provide activities for implementation assistance, project administration, reporting, and general project information. The implementation assistance project activities 310 provide a user central access to an accelerated methodology and implementation roadmap 312, which provides information content about the most important software components and methodologies that may be used to access customize, and then implement multiple programs or components which may be utilized by market participants the software components. A user also may use this project activity to navigate through the various project phases and corresponding activities 316 mentioned above, read documentation about and use implementation accelerators 318, which are used to facilitate project tasks.

The project administration activities 320 provide the user with access to functions to add, view or modify general data related to the project 322, maintain a list of team members assigned to a project 324, define the project's system landscape 326, and provide standards for documentation 327. The project information activities may also provide a user with access links to other software tools 328 that may be used to evaluate programs or components which may be utilized by market participants. The user may also use the project administration activities to configure the project such that a user's access to tool activities and functions depends on his role in the project 329. For example, a project manager's role may be defined such that the project manager may only perform the tasks of project administration, defining a business blueprint, performing project configuration, and testing. The role of an application consultant may be defined such that the application consultant may only install best practices, define a business blueprint, perform project configuration, check consistency, and perform project testing. Similarly, the role of a technical consultant may be configured, such that the technical consultant may only define a system landscape, install best practices, set up system landscapes and perform a data transfer. For example, an SAP-specific role, such as that of a basis consultant, may be configured such that the basis consultant may only define a business blueprint, perform authorization, carry out development, perform testing, perform a data transfer. The role of a read only user is configured such that the read only user may not use the tool to perform any project activity, but may use the tool only to display information related to the solution project. A master role may also be provided that authorizes a user to use all tool activities and functions.

The reporting activity 330 provides the user with access to functions that provide status reports for all major project phases 332 and allows the status reports to be downloaded 334. The general project reporting information activity 340 provides the user an overview of the project status 342. The user may choose to display an overview of the project status information in different ways to a project manager and a project member.

Figure 5:
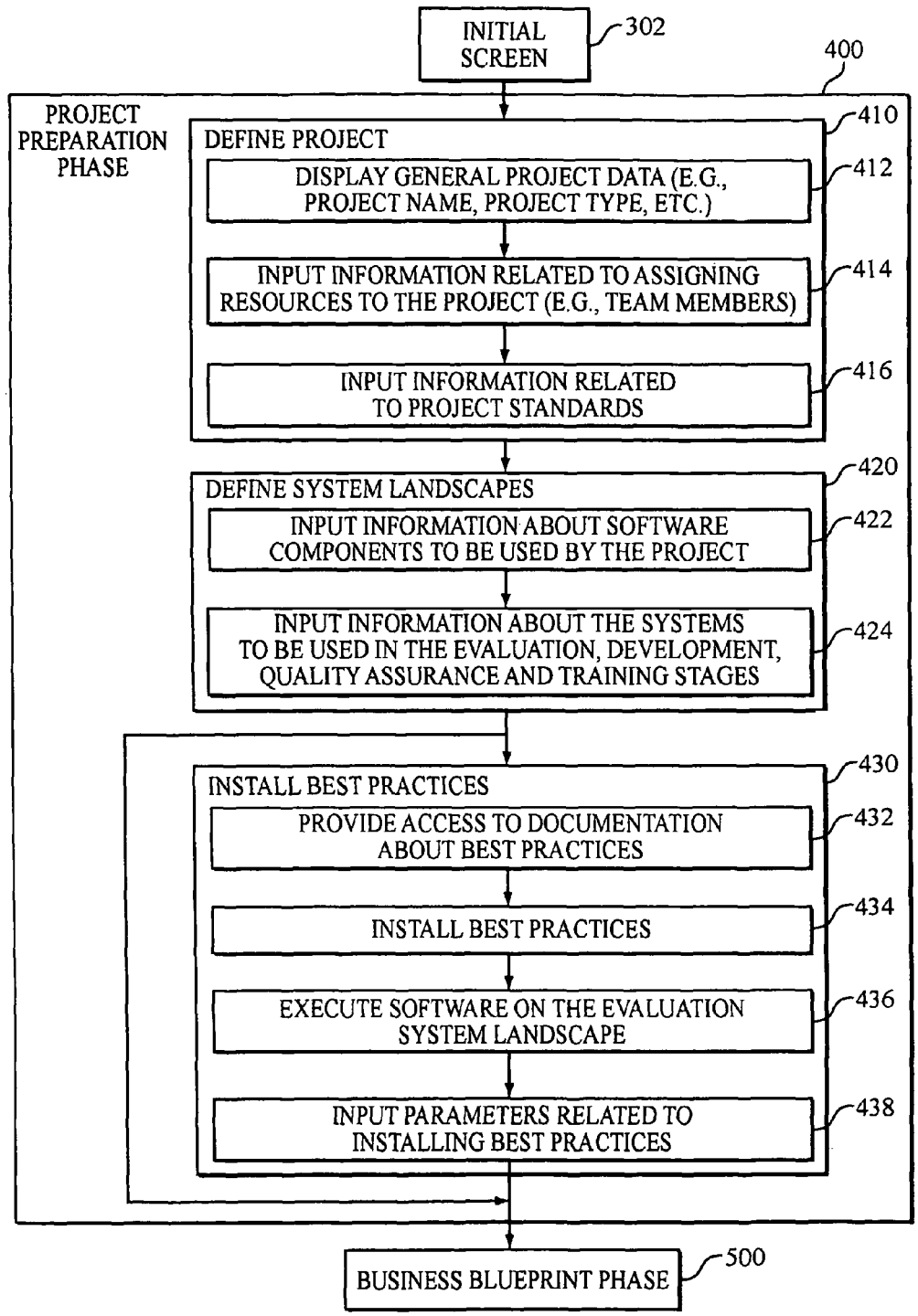
FIG. 5 is a detailed view of a project preparation phase of a process for implementing multiple software components, according to one implementation.

FIG. 5 illustrates the project activities that may be performed in the project preparation phase 400. When using the system architect tool, a user will see an initial screen 302 on the user interface. The initial screen may provide general project status information. By selecting the project preparation activity the user may define multiple programs or components which may be utilized by market participants 410. The user may input general project data, such as the project name and a project type 412. A user may further configure the project by inputting information about assigning resources (e.g., team members) to the project 414, define the scope of the project by selecting business scenarios (e.g., Business-to-Business Internet Sales, Business-to-Consumer Internet Sales, Procurement of Indirect Material or Procurement of Direct Material) and information related to project standards 416. Using another project preparation activity, the user may define a system landscape 420. A system landscape may include information about roles of the systems involved in the project, software components, software releases, information to be exchanged between each system, and functions to process exchanged information within a system. For example, a user may input information about software systems that the project will use and information about the systems to be used in the evaluation, development, quality assurance and training stages 424. The user may use the solution architect tool to input information related to the user's system landscape that indicates one or more software components included in the system landscape 422. A user also may optionally use the tool to access documentation (e.g., how to specify an e-mail recipient) about installing best practices (described below) related to the evaluation system landscape 432, install best practices 434, and execute software (e.g., SAP's BCSets) 436 on the evaluation system landscape that sets up middleware components, sets up connections between related systems and sets up configuration to run pre-configured best practices processes in the evaluation system landscape. The user may also input parameters related to installing best practices 438. Therefore, the solution architect tool integrates and makes accessible best practices information to its users.

Best practices refers to business content which includes proven methodology along with practices and extensive documentation. Best practices may include information about business scenarios, business blueprints, configuration settings, user roles (e.g., a "strategic purchaser" has duties that include creating vehicles in a vehicle pool, searching for vehicle, and maintaining vehicle status) and training materials related to programs or components which may be utilized by market participants. A user who is creating a solution by accessing and customizing multiple programs or components which may be utilized by market participants may then use the tool to access information about the best methodologies and practices to use in business scenarios related to customer relationship management, such as Internet sales or mobile sales. For example, a user may use the best practices information available from the solution architect tool during the configuration stage of a solution that creates solution maps. Best practices will make information available to the user about business-to-business selling, which lets a business customers buy products from its website by logging in using a user name and password. The user name and password information allows the business to automatically identify the company that the customer works for. Best practices may also make information available to a user about business-to-consumer selling, which contains information about how to set up a web shop and offer the businesses products directly to consumers. While creating a solution related to Internet selling, the user may use the best practices information made available by the solution architect to learn about the techniques of cross-selling and up-selling by automatically offering higher value alternatives and related products to increase sales volume and revenues.

In another example, the solution architect tool 204 may make best practices information available about mobile sales business scenarios. The tool may provide the user with access to information about how to perform customer visits with order entry. This scenario describes the typical activities that a field sales representative may have to perform when visiting clients and taking orders. The tool may also provide the user, who is creating a solution for accessing, customizing, and implementing multiple programs or components that may be utilized by market participants, with access to information about how to perform campaign management, such as information about supporting a sales manager's promotions, product launches and marketing campaigns or provide the user access to information about opportunity management, such as information about cross-selling analysis and handling customer contact from the time of initial contact through conclusion of the project.

A user who is creating the solution may also use the tool to access information about the best methodologies and practices to use in business scenarios related to supply chain management, such as supply chain planning, vendor managed inventory, collaborative planning forecasting and replenishment and collaborative order promising. Alternatively, a user may use the tool to access information about the best methodologies and practices to use in business scenarios related to enterprise buyer procurement, such as procurement of indirect materials, procurement of direct materials, component planning, content management and local procurement.

Figure 6:
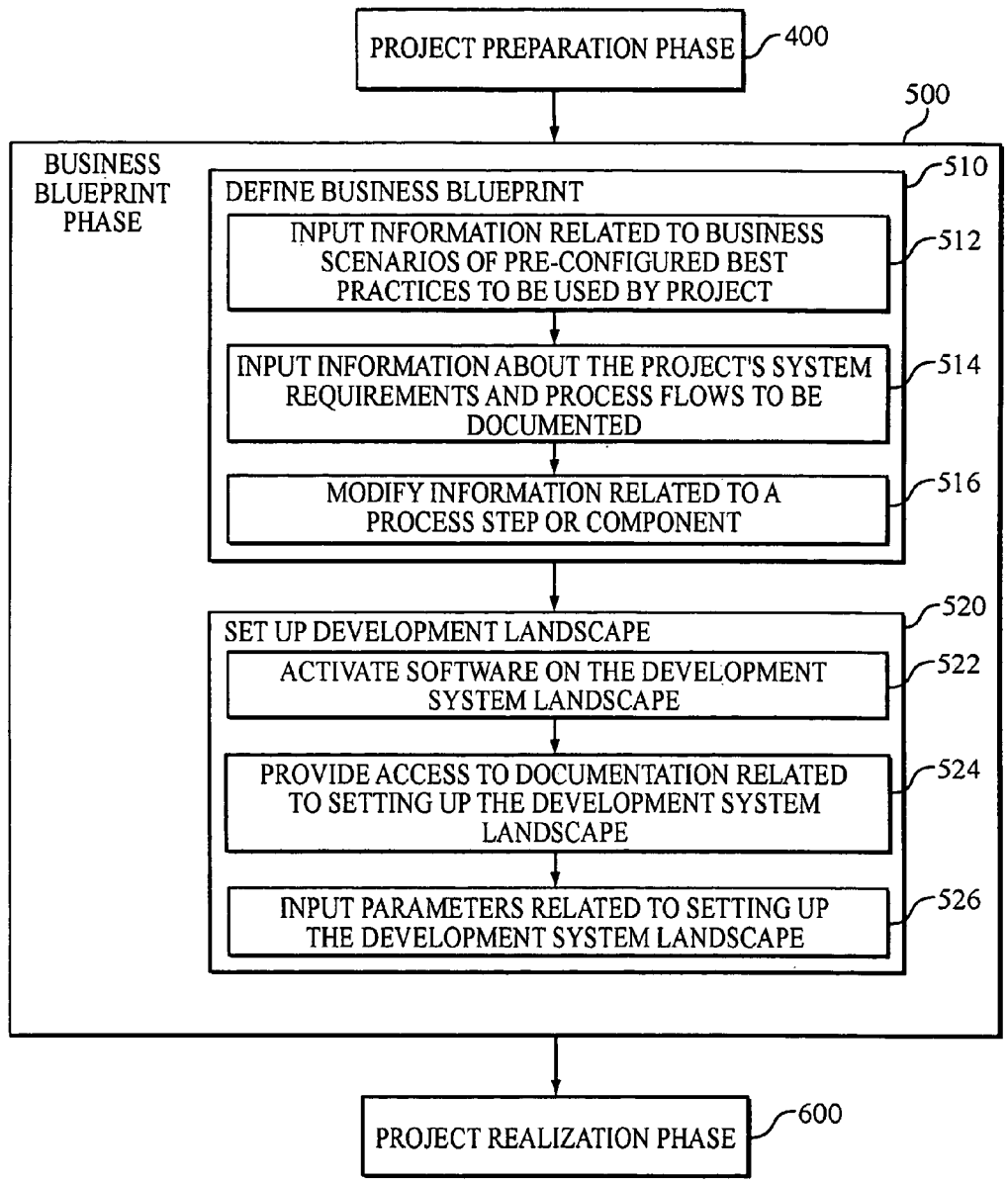
FIG. 6 is a detailed view of a business blueprint phase of a process for implementing multiple software components, according to one implementation.

FIG. 6 illustrates the project activities that may be performed in the business blueprint project phase 500. Using the business blueprint phase activities, a user may define a business blueprint 510. The user may define the project scope by selecting business scenarios of pre-configured best practices to be used in the project 512. The user also may input information about the system requirements (e.g., interfaces, conversions, forms, or reports) and process flows of his project to be documented in a template document. While defining the business blueprint, a user may adjust the project structure by modifying one or more process steps (e.g., create delivery, generate picking list, create invoice, etc.) or components (e.g., SAP's R/3 back end system or SAP's Customer Relationship Management software module) used by the system 516. Another activity that may be performed by the user in the business blueprint project phase 500 is setting up the development system landscape 520. A user may set up the development system landscape by activating software (e.g., SAP's BCSets) 522 on the development system landscape which sets up middleware components and establishes connectivity between the development landscape and related systems. The user can also use a project activity in this phase to access documentation (e.g., Performing Preliminary Activities for Generation) related to setting up the development system landscape 524 and input parameters related to set up the development system landscape 526.

Figure 7A:
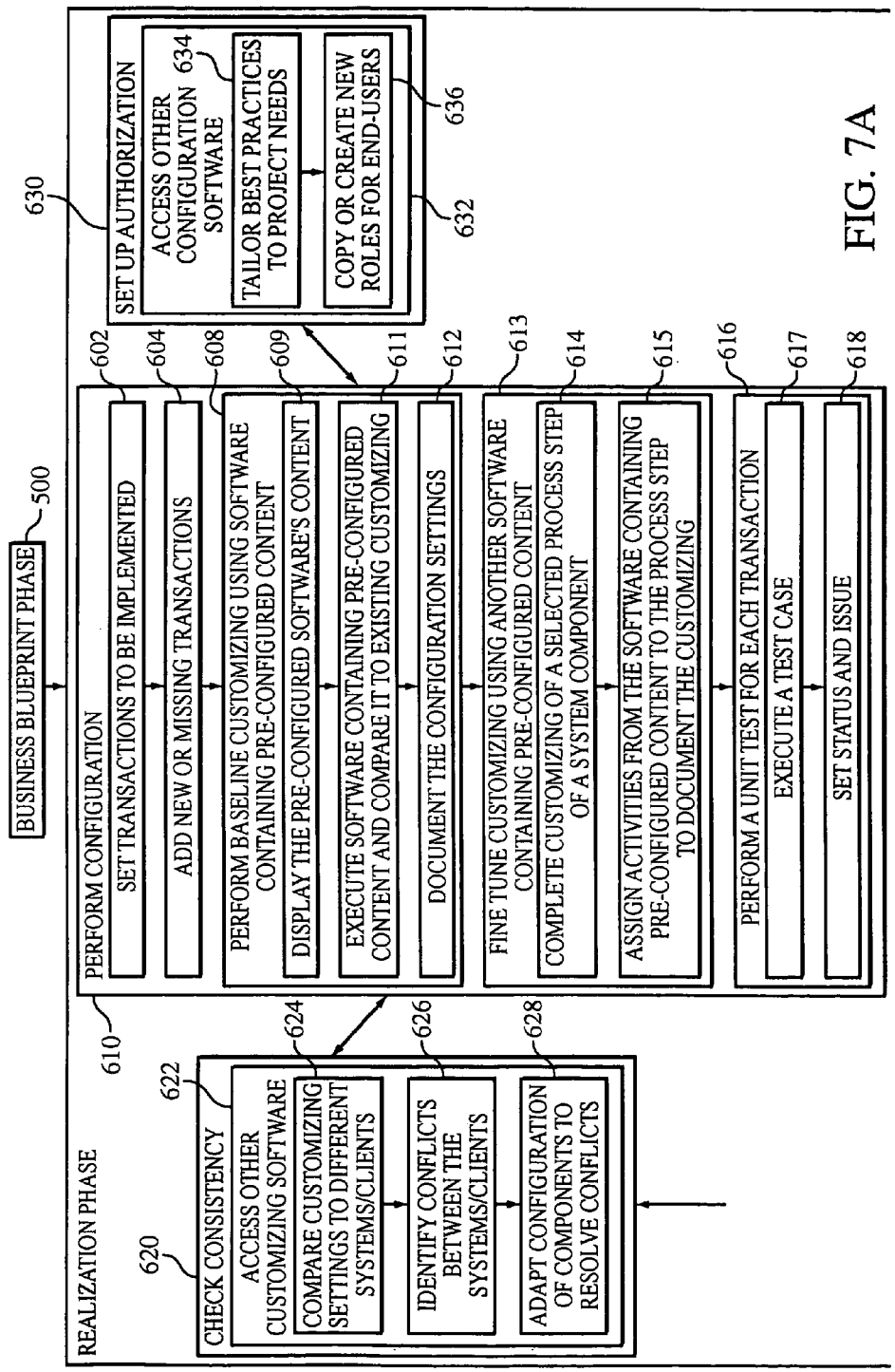
FIG. 7 is a detailed view of a realization phase of a process for implementing multiple software components, according to one implementation.
Figure 7B:
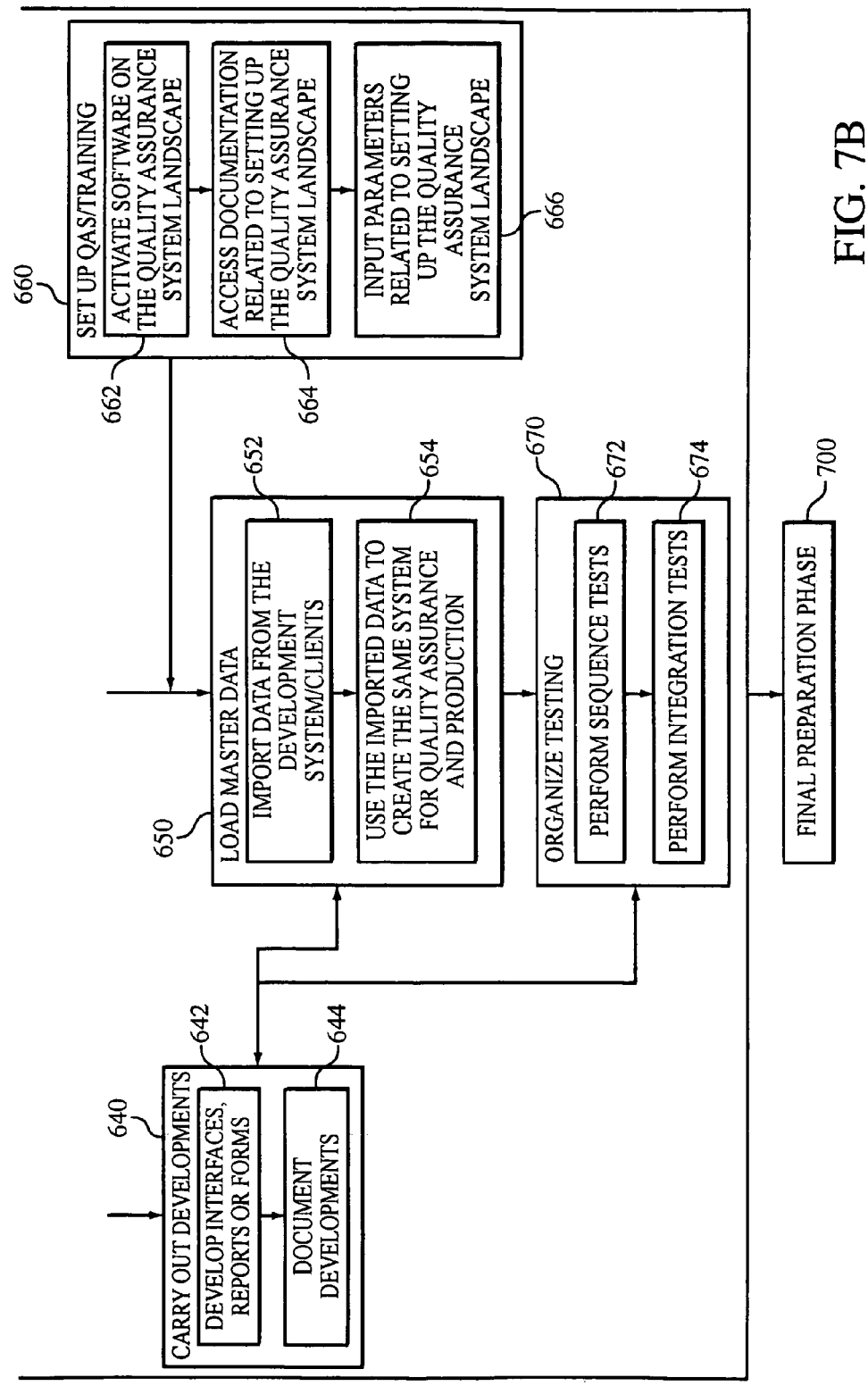

FIG. 7 illustrates the project activities that may be performed during the realization project phase 600. Using a realization activity of the solution architect tool, a user may select the perform configuration activity 610. When performing a configuration, a user may set transactions (e.g., update live cache, replicate sales order, create sales order, etc.) of programs or components to be implemented in the project 602. The user may also add a new or missing transaction 604. The user may perform a baseline customizing using software that contains pre-configured content 608. This may be accomplished by using the tool 204 to display the content of the pre-configured software 609. The user then may execute the software containing the pre-configured content and compare it to the existing system customizing 611. The user also may document the current configuration settings 612. Once the initial configuration settings are made, the user may fine tune the system customizing using additional software that contains pre-configured content 613 to complete customizing of a selected process step of a system component 614 and assign activities, such as implementation guide activities, to the process step to document the customizing 615. Finally, during the perform configuration phase the user may perform a unit test for each transaction 616, by executing a test case and setting a status and issue for the transaction 618. For example, a user may use the tool 204 to set the following transactions: create an order, check availability and order the product. The user may then add a transaction, such as process the sales order. The user may use to tool to compare the customizing to a pre-customized business scenario, Business-to-Business Internet Sales. The user also may fine-tune the customizing by adding a process step, such as post goods issue, from the component R/3 to the customization.

The user may also use the tool 204 to check consistency of the customizing 620 during the realization phase 600. The user may use the tool 204 to access another customizing program 622 (e.g., SAP's Customizing Scout software module) which can compare the customizing settings with those of different clients 624, identify any conflicts between the systems/clients and adapt configuration of the components to resolve conflicts 628.

Another realization phase activity is set up authorization 630. Using set up authorization, a user may access configuration software 632 to tailor best practices to project-specific needs 634. The user may also use the configuration software (e.g., SAP's Access Profile Generator software module) to copy or create new roles for the end users 636. A user may use the "Carry Out Developments" activity 640 to develop interfaces, reports or forms 642 and to document developments about new releases 644. Additionally, a user may use the solution architect tool 204 to load master data by importing data from the development systems/clients 652 and to use the imported data to create the same system in quality assurance and production systems 654.

Additionally, during the realization project phase, a user may set up a quality assurance and/or training system landscape 660 by activating software (e.g., SAP's BCSets) to set up middleware components and to set up connectivity between the quality assurance system and/or the testing system and related systems 662. The user may also access documentation related to setting up the quality assurance system landscape 664. The user also may input information about the parameters required to set up the quality assurance and/or training systems 666. The user may also use the user interface to organize testing 670 during the realization phase of the project solution. The user may define sequence tests to be executed on a project, perform sequence 672 and integration tests 674 and view information about the test status, such as the percentage of tests that resulted in errors.

Figure 8:
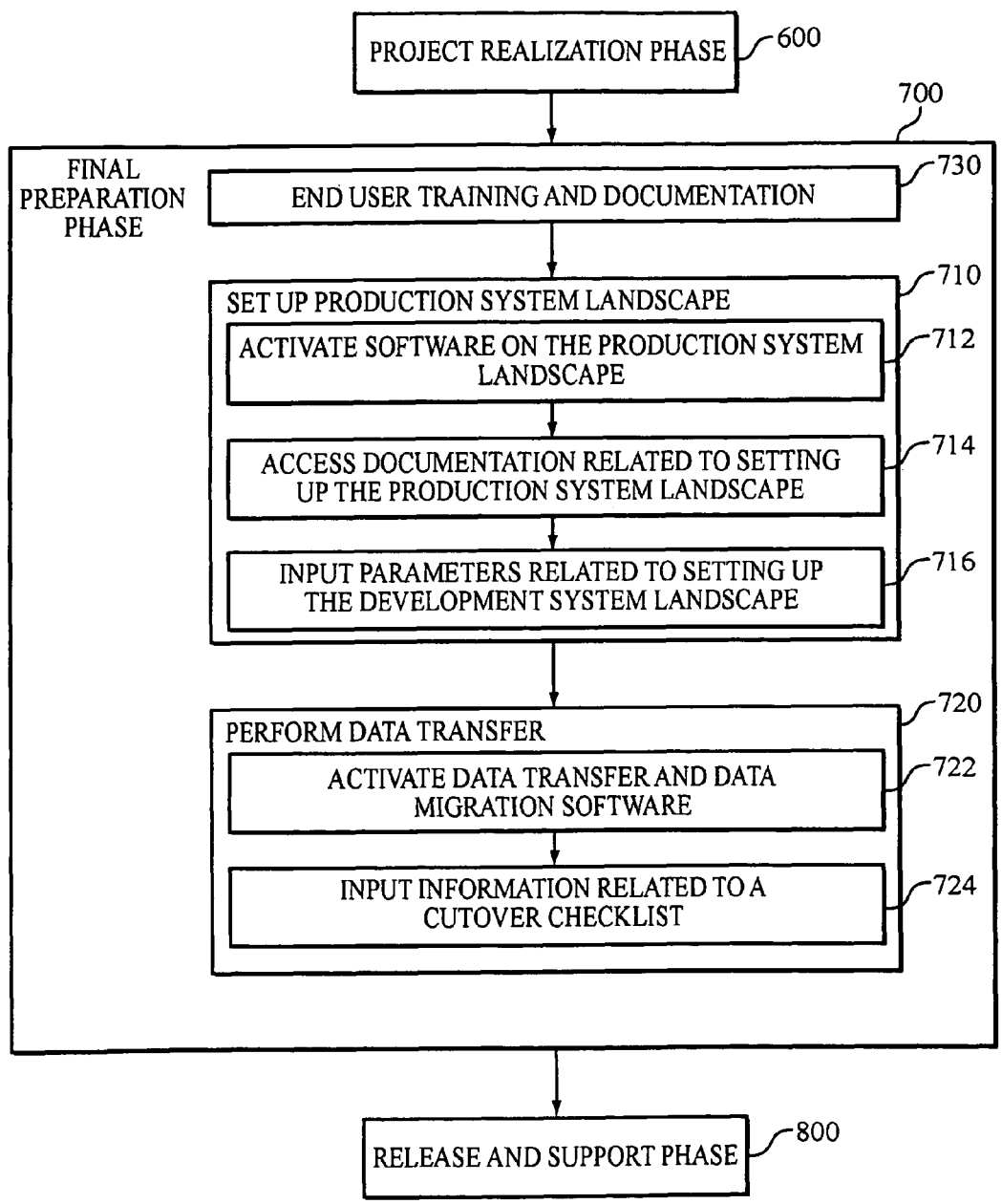
FIG. 8 is a detailed view of a final preparation phase of a process for implementing multiple software components, according to one implementation.

Referring to FIG. 8, during the final preparation project stage 700, the user may to set up a production system landscape 710 by activating software (e.g., SAP's BCSets) on the production system landscape to set up middleware components and set up connectivity between the production system landscape and related systems 712. The user may also use the solution architect to access documents related to setting up the production system landscape, determine the parameters required to set up the production landscape system 714 and input the required parameters to set up the production landscape system to be entered in a document 716. The user also may use the user interface during the final preparation project phase to activate data transfer and data migration software to transfer data 720 related to the solution project from one system to another in preparation of the software release 722 and to access information related to a cutover checklist 724, which indicates when a system will be upgraded. A user also may use the user interface to create and access documentation related to end-user training 730. The final project phase of the solution architect is the release and support phase. During this stage the solution will be activated in a production environment and customer support may be provided to the end-user 800.

Those skilled in the art will appreciate from the foregoing description that the methods and systems identified herein may be advantageously modified in an almost limitless number of ways. For instance, one or more of the foregoing techniques may be advantageously performed in isolation or in any desired combination or order. The software may be configured to be executed on any variety of platforms, such as intranets, wireless networks, and local hard disks by way of non-limiting example. The software may be executed on one or more computers, servers or distributed servers. The systems and techniques described herein may be implemented in environments without software, including as "paper and pencil" versions. Any amount of proprietary content may be incorporated into this system, such as propriety business models, industry trends, and market forces. Any aspect of the business strategy evaluation, value calculations, etc. may be implemented at a finer granularity by use of more detailed information, models, inputs and/or algorithms, for example. None of the particular techniques need be performed in the order indicated unless specifically stated. To the contrary, the techniques may be freely modified by substituting and/or reordering steps as suitable for particular implementations. Any output from the system described herein may be presented in any manner suitable for a particular user, and may include any aspect of the business strategies, industry trends, and market forces described herein.

Various features of the system may be implemented in hardware, software, or a combination of hardware and software. For example, some aspects of the system may be implemented in computer programs executing on multiple programmable computers. Each program may be implemented in a high level procedural or object-oriented programming language to communicate with servers.

Furthermore, each such computer program may be stored on a storage medium, such as read-only-memory (ROM), readable by a machine, such as a general or special purpose programmable computer, for configuring and operating the machine when the storage medium is read by the machine to perform the functions described above.

What is claimed is:

1. A computer implemented method, performed by a processor executing instructions, for providing a portal for implementation of multiple software components, the method comprising:

installing a portal on a server device in a computer system, the portal accessible from each of multiple client devices in the computer system for customizing multiple software components and implementing the software components on any of the multiple client devices;

performing a project preparation phase on the server device in which the portal interacts with at least one of the client devices to receive first user-provided information for an implementation project;

determining and storing on the server device, based on the first user-provided information, a definition of the implementation project, system landscape information identifying the multiple software components for the implementation project, and multiple pre-configured practice processes for the implementation project;

performing a business blueprint creation phase on the server device in which the portal interacts with the client device to receive second user-provided information;

generating and storing on the server device, based on the second user-provided information, a business blueprint that documents: requirements for the defined implementation project, a selection of at least one of the multiple pre-configured practice processes, and a development system landscape definition that includes the identified software component;

performing a realization phase on the server device that includes configuring the identified software components according to the selected pre-configured practice process, and evaluating consistency of the identified software components according to the requirements;

performing a preparation phase on the server device that includes setting up the system landscape including the identified software components according to the development system landscape definition, and transferring data to at least one of the multiple client devices;

performing a release and support phase on the server device that includes releasing the identified software component and providing support;

wherein the configuration performed in the realization phase involves receiving user-entered information defining or modifying one or more transactions of the software components for the project, receiving user-entered information defining a baseline customization of one or more software components using predefined content, and fine tuning the baseline customization using software with other predefined content; and wherein defining the baseline customization includes displaying the predefined content, executing the software components using the predefined content and comparing to an existing customization, and receiving user-entered information documenting current configuration settings.

2. The method of claim 1, wherein the project definition involves receiving user-entered general project data, resource assignment information and project standard information.

3. The method of claim 1, where definition of the system landscape involves receiving user-entered information about the software components, and receiving user-entered information about a system for use in the testing of the implemented solution.

4. The method of claim 1, wherein the creation of the business blueprint involves receiving user-entered information selecting a business scenario of preconfigured best practices, receiving user-entered information for the requirements, and receiving user-entered information modifying at least one process step or software component.

5. The method of claim 1, wherein setting up the development system landscape involves activating software on the development system landscape, providing user access to documentation for setting up the development system landscape, and receiving user-entered parameters setting up the development system landscape.

6. The method of claim 1, wherein fine tuning the baseline customization includes receiving user-entered information that completes customization of at least one process step of the multiple software components, and wherein documenting the current configuration settings includes the user assigning one or more activities to the process step.

7. The method of claim 1, wherein setting up the system landscape for production includes activating software on the production system landscape, providing user access to documentation on setting up the system landscape for production, and receiving user-entered parameters for setting up the system landscape for production.

8. The method of claim 1, wherein performing the data transfer includes activating software for data transfer and data migration, and receiving user-entered information for a cutover checklist.

9. A computer program product tangibly embodied in a computer-readable storage medium and comprising instructions that when executed by a processor perform a method for providing a portal for implementation of multiple software components, the method comprising:

providing, on a server device in a computer system, a tool for customizing one or more of multiple software components and implementing the software component on any of multiple client devices in the computer system;

providing, on the server device, a portal for the tool that is accessible from each of the multiple client devices, the portal allowing access to content, software tools and implementation methodologies of the tool;

performing a project preparation phase using the tool, the project preparation phase being initiated for a project using at least one of the client devices and involving project definition, definition of a system landscape and installation of the content;

performing a business blueprint creation phase using the tool, the business blueprint creation phase being initiated using the client device and involving creation of a business blueprint that documents requirements for the project and setting up a development system landscape for the project;

performing a realization phase using the tool, the realization phase involving configuration of at least one of the software components using the content, consistency checking and testing of an implemented solution;

performing a preparation phase using the tool, the preparation phase involving setting up the system landscape for production, performing data transfer and conducting end user training;

performing a release and support phase using the tool, the release and support phase involving release of the multiple software components and providing support;

wherein the configuration performed in the realization phase involves receiving user-entered information defining or modifying one or more transactions of the software components for the project, receiving user-entered information defining a baseline customization of one or more software components using predefined content, and fine tuning the baseline customization using software with other predefined content; and wherein defining the baseline customization includes displaying the predefined content, executing the software components using the predefined content and comparing to an existing customization, and receiving user-entered information documenting current configuration settings.

10. A computer system comprising:

a server device including at least one computer-readable storage medium comprising instructions that when executed by one or more processors perform operations for providing a tool for customizing one or more of multiple software components and implementing the software component on any of multiple client devices, and a portal for the tool that is accessible from each of the multiple client devices, the portal allowing access to content, software tools and implementation methodologies of the tool;

wherein the tool is configured to perform a project preparation phase, the project preparation phase being initiated for a project using at least one of the client devices and involving project definition, definition of a system landscape and installation of the content;

wherein the tool is configured to perform a business blueprint creation phase, the business blueprint creation phase being initiated using the client device and involving creation of a business blueprint that documents requirements for the project and setting up a development system landscape for the project;

wherein the tool is configured to perform a realization phase, the realization phase involving configuration of at least one of the software components using the content, consistency checking and testing of an implemented solution;

wherein the tool is configured to perform a preparation phase, the preparation phase involving setting up the system landscape for production, performing data transfer and conducting end user training;

wherein the tool is configured to perform a release and support phase, the release and support phase involving release of the multiple software components and providing support;

wherein the configuration performed in the realization phase involves receiving user-entered information defining or modifying one or more transactions of the software components for the project, receiving user-entered information defining a baseline customization of one or more software components using predefined content, and fine tuning the baseline customization using software with other predefined content; and wherein defining the baseline customization includes displaying the predefined content, executing the software components using the predefined content and comparing to an existing customization, and receiving user-entered information documenting current configuration settings.

* * * * *